(12) United States Patent
Zheng

(10) Patent No.: US 9,467,447 B2
(45) Date of Patent: *Oct. 11, 2016

(54) NETWORK ACCESS METHOD, AUTHENTICATION METHOD, COMMUNICATIONS SYSTEM AND RELEVANT DEVICES

(71) Applicant: Huawei Technologies Co., Ltd., Shenzhen (CN)

(72) Inventor: Ruobin Zheng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/565,254

(22) Filed: Dec. 9, 2014

(65) Prior Publication Data

US 2015/0095991 A1 Apr. 2, 2015

Related U.S. Application Data

(63) Continuation of application No. 14/088,888, filed on Nov. 25, 2013, now Pat. No. 8,925,067, which is a continuation of application No. 12/883,394, filed on Sep. 16, 2010, now Pat. No. 8,594,103, which is a continuation of application No. PCT/CN2009/071009, filed on Mar. 25, 2009.

(30) Foreign Application Priority Data

Mar. 26, 2008 (CN) .......................... 2008 1 0084076

(51) Int. Cl.
*H04L 29/06* (2006.01)
*H04L 29/12* (2006.01)

(52) U.S. Cl.
CPC ........... *H04L 63/0892* (2013.01); *H04L 63/08* (2013.01); *H04L 29/1232* (2013.01); *H04L 61/2092* (2013.01)

(58) Field of Classification Search
CPC ............... H04L 63/0892; H04L 63/08; H04L 29/1232; H04L 61/2092

USPC ........... 726/4, 3, 8, 9, 12, 29; 713/155, 171, 713/176, 189

See application file for complete search history.

(56) References Cited

U.S. PATENT DOCUMENTS 5,652,872 A * 7/1997 Richter ............... G06F 11/3648 703/26
6,539,457 B1 * 3/2003 Mulla ................. G06F 12/0897 711/117

(Continued)

FOREIGN PATENT DOCUMENTS

CN 1677981 10/2005
CN 1798158 7/2006

(Continued)

OTHER PUBLICATIONS

Chinese Office Action mailed May 3, 2012 issued in corresponding Chinese Patent Application No. 200810084076.1.

(Continued)

*Primary Examiner* — David García Cervetti
(74) *Attorney, Agent, or Firm* — Slater Matsil, LLP

(57) ABSTRACT

A network access method, an authentication method, a communications system, and relevant devices are provided. The authentication method includes: receiving a request message sent from an Access Node (AN), wherein the request message carries subscriber line information and a Link-Local Address (LLA); sending an access request to an Authentication, Authorization and Accounting (AAA) server according to the subscriber line information; receiving an authentication result indicating the authentication is successful; determining whether an address matching the LLA carried in the request has been stored in the BNG; and storing the LLA in the BNG, if the address matching the LLA is not stored in the BNG.

9 Claims, 7 Drawing Sheets

(56) References Cited

U.S. PATENT DOCUMENTS

| | | | | |
|---|---|---|---|---|
| 6,611,521 B1* | 8/2003 | McKay | H04L 1/08 | 370/392 |
| 6,895,007 B1* | 5/2005 | Teraoka | H04L 29/12216 | 370/352 |
| 6,959,009 B2* | 10/2005 | Asokan | H04L 29/06 | 370/465 |
| 7,006,472 B1* | 2/2006 | Immonen | H04L 12/5695 | 370/332 |
| 7,036,142 B1* | 4/2006 | Zhang | H04L 63/0815 | 709/227 |
| 7,526,528 B2* | 4/2009 | Foster | G06F 17/30899 | 709/217 |
| 7,583,635 B2* | 9/2009 | Kwak | H04L 29/12311 | 370/331 |
| 7,684,392 B2* | 3/2010 | Saito | H04L 29/12311 | 370/331 |
| 7,746,873 B2* | 6/2010 | Saito | H04L 29/12311 | 370/338 |
| 7,860,978 B2* | 12/2010 | Oba | H04L 12/4633 | 709/200 |
| 7,920,575 B2* | 4/2011 | Asokan | H04L 29/06 | 370/389 |
| 7,954,141 B2* | 5/2011 | De Lutiis | H04L 29/12216 | 706/10 |
| 8,090,828 B2* | 1/2012 | Leung | H04L 61/2015 | 709/226 |
| 8,107,396 B1* | 1/2012 | Sharma | H04L 61/103 | 370/254 |
| 8,175,057 B2* | 5/2012 | Weniger | H04W 8/087 | 370/331 |
| 8,325,677 B2* | 12/2012 | Toyokawa | H04W 8/087 | 370/331 |
| 8,533,455 B2* | 9/2013 | Haddad | H04L 9/0844 | 380/270 |
| RE44,592 E* | 11/2013 | Asokan | H04L 12/56 | 370/389 |
| 8,887,234 B2* | 11/2014 | Wen | H04L 12/2859 | 713/168 |
| RE45,465 E* | 4/2015 | Toyokawa | H04B 7/18528 | 370/328 |
| 9,351,145 B2* | 5/2016 | Giaretta | H04W 48/17 | |
| 2001/0017856 A1* | 8/2001 | Asokan | H04L 29/06 | 370/389 |
| 2002/0162029 A1* | 10/2002 | Allen | H04L 12/2876 | 726/21 |
| 2002/0172207 A1* | 11/2002 | Saito | H04L 29/12311 | 370/400 |
| 2003/0026230 A1* | 2/2003 | Ibanez | H04L 29/12264 | 370/338 |
| 2004/0028061 A1* | 2/2004 | Sawada | H04L 29/12311 | 370/401 |
| 2004/0030769 A1* | 2/2004 | Lim | H04L 29/06 | 709/223 |
| 2004/0071120 A1* | 4/2004 | Grech | H04L 29/12311 | 370/338 |
| 2004/0083306 A1* | 4/2004 | Gloe | H04L 29/12066 | 709/245 |
| 2004/0141511 A1* | 7/2004 | Rune | H04L 45/20 | 370/401 |
| 2004/0148364 A1* | 7/2004 | Kim | H04L 29/06 | 709/217 |
| 2004/0148412 A1* | 7/2004 | Itoh | H04L 29/12264 | 709/229 |
| 2004/0151193 A1* | 8/2004 | Rune | H04L 29/06 | 370/401 |
| 2004/0153520 A1* | 8/2004 | Rune | H04L 12/4616 | 709/206 |
| 2004/0156318 A1* | 8/2004 | Rune | H04W 92/02 | 370/235 |
| 2004/0156384 A1* | 8/2004 | Rune | H04W 40/02 | 370/432 |
| 2004/0167988 A1* | 8/2004 | Rune | H04L 12/4616 | 709/238 |
| 2004/0196797 A1* | 10/2004 | Lee | H04W 8/12 | 370/313 |
| 2004/0208187 A1* | 10/2004 | Mizell | H04W 8/065 | 370/401 |
| 2004/0225750 A1* | 11/2004 | Lim | H04L 29/12009 | 709/245 |
| 2004/0240474 A1* | 12/2004 | Fan | H04L 29/12009 | 370/475 |
| 2004/0243850 A1* | 12/2004 | Oishi | H04L 45/00 | 726/21 |
| 2005/0018632 A1* | 1/2005 | Lee | H04W 8/12 | 370/329 |
| 2005/0083859 A1* | 4/2005 | Kang | H04L 29/12254 | 370/254 |
| 2005/0128969 A1* | 6/2005 | Lee | H04W 36/32 | 370/313 |
| 2005/0165953 A1* | 7/2005 | Oba | H04L 12/4633 | 709/238 |
| 2005/0169220 A1* | 8/2005 | Sreemanthula | H04L 12/2856 | 370/338 |
| 2005/0220144 A1* | 10/2005 | Ishiyama | H04L 29/06 | 370/471 |
| 2005/0237946 A1* | 10/2005 | Borowski | H04L 29/1232 | 370/254 |
| 2005/0237983 A1* | 10/2005 | Khalil | H04L 63/061 | 370/338 |
| 2005/0265360 A1* | 12/2005 | Kim | H04L 12/2854 | 370/400 |
| 2005/0271032 A1* | 12/2005 | Yun | H04L 29/12009 | 370/349 |
| 2005/0271034 A1* | 12/2005 | Asokan | H04L 29/06 | 370/349 |
| 2006/0048212 A1* | 3/2006 | Tsuruoka | H04L 9/0866 | 726/4 |
| 2006/0080728 A1* | 4/2006 | Wen | H04L 12/2859 | 726/4 |
| 2006/0095546 A1* | 5/2006 | Saaranen | H04L 29/1232 | 709/220 |
| 2006/0140177 A1* | 6/2006 | Karhu | H04L 29/06 | 370/356 |
| 2006/0187881 A1* | 8/2006 | Kwak | H04L 29/12311 | 370/331 |
| 2006/0209760 A1* | 9/2006 | Saito | H04L 29/12311 | 370/331 |
| 2006/0274693 A1* | 12/2006 | Nikander | H04W 36/0016 | 370/331 |
| 2006/0291426 A1* | 12/2006 | Park | H04W 8/26 | 370/331 |
| 2007/0076607 A1* | 4/2007 | Voit | H04L 61/2015 | 370/230 |
| 2007/0223397 A1* | 9/2007 | Gerasimov | H04L 29/1232 | 370/254 |
| 2007/0274232 A1* | 11/2007 | Axelsson | H04L 45/00 | 370/254 |
| 2007/0277228 A1* | 11/2007 | Curtis | H04L 63/0227 | 726/4 |
| 2007/0298760 A1* | 12/2007 | Leis | H04L 63/08 | 455/404.1 |
| 2008/0024819 A1* | 1/2008 | Tanji | H04L 29/12216 | 358/1.15 |
| 2008/0107067 A1* | 5/2008 | Baek | H04L 29/06027 | 370/328 |
| 2008/0127320 A1* | 5/2008 | De Lutiis | H04L 29/12216 | 726/9 |
| 2008/0205296 A1* | 8/2008 | Zhang | H04L 49/354 | 370/254 |
| 2008/0244090 A1* | 10/2008 | Zhu | H04L 29/12216 | 709/242 |
| 2008/0270673 A1* | 10/2008 | Sridhar | H04L 12/2856 | 711/6 |
| 2008/0301434 A1* | 12/2008 | Haddad | H04L 9/0844 | 713/153 |
| 2008/0310323 A1* | 12/2008 | Shirota | H04L 29/12056 | 370/254 |
| 2008/0320111 A1* | 12/2008 | Yan | H04L 12/2898 | 709/220 |
| 2008/0320165 A1* | 12/2008 | Jeon | H04L 45/16 | 709/242 |
| 2009/0010206 A1* | 1/2009 | Giaretta | H04W 8/005 | 370/328 |

(56) References Cited

U.S. PATENT DOCUMENTS

| | | | |
|---|---|---|---|
| 2009/0097453 A1* | 4/2009 | Weniger | H04W 8/087 370/331 |
| 2009/0119280 A1* | 5/2009 | Waters | G06F 17/30864 |
| 2009/0158388 A1* | 6/2009 | Sridhar | H04L 41/0604 726/2 |
| 2009/0219832 A1* | 9/2009 | Velev | H04W 36/0011 370/254 |
| 2009/0222537 A1* | 9/2009 | Watkins | H04L 29/12311 709/221 |
| 2009/0290529 A1* | 11/2009 | Toyokawa | H04W 8/087 370/315 |
| 2010/0199332 A1* | 8/2010 | Bachmann | H04L 63/0428 726/4 |
| 2010/0215019 A1* | 8/2010 | Velev | H04W 8/06 370/331 |
| 2010/0284368 A1* | 11/2010 | Haddad | H04L 63/0823 370/331 |
| 2010/0290478 A1* | 11/2010 | Xia | H04W 40/246 370/401 |
| 2010/0296481 A1* | 11/2010 | Weniger | H04L 63/0807 370/331 |
| 2010/0313024 A1* | 12/2010 | Weniger | H04L 63/0823 713/170 |
| 2010/0316019 A1* | 12/2010 | Liu | H04L 29/12264 370/331 |
| 2011/0066855 A1* | 3/2011 | Zeng | H04L 63/0892 713/168 |
| 2011/0122815 A1* | 5/2011 | Velev | H04W 8/082 370/328 |
| 2011/0149839 A1* | 6/2011 | Toyokawa | H04W 8/087 370/328 |
| 2012/0127975 A1* | 5/2012 | Yang | H04W 12/06 370/338 |
| 2012/0131644 A1* | 5/2012 | Khalil | H04L 63/061 726/3 |
| 2013/0288640 A1* | 10/2013 | Bonner | H04L 63/102 455/406 |
| 2014/0036901 A1* | 2/2014 | Giaretta | H04W 8/005 370/338 |

FOREIGN PATENT DOCUMENTS

| | | |
|---|---|---|
| CN | 101064648 | 10/2007 |
| EP | 1770940 | 4/2007 |

OTHER PUBLICATIONS

2nd Chinese Office Action issued Dec. 31, 2012 in corresponding Chinese Patent application No. 200810084076.1 (8 pages) (8 pages English translation).

"Working Text WT-146 Draft Version 2.6," DSL Forum; Subscriber Sessions; Architecture and Transport Working Group; Nov. 26, 2007; pp. 1-33.

European Office Action dated May 31, 2012 issued in corresponding European Patent Application No. 09725360.3.

European Search Report dated Jul. 28, 2011 issued in corresponding European Patent Application No. 09725360.3.

First Action Interview Pilot Program Communication mailed Oct. 26, 2012 in parent U.S. Appl. No. 12/883,394 (21 pages).

Final Office Action mailed Apr. 11, 2013 in parent U.S. Appl. No. 12/883,394 (11 pages).

Written Opinion of the International Searching Authority mailed Jul. 2, 2009 issued in corresponding International Patent Application No. PCT/CN2009/071009.

\* cited by examiner

US 9,467,447 B2

NETWORK ACCESS METHOD, AUTHENTICATION METHOD, COMMUNICATIONS SYSTEM AND RELEVANT DEVICES

This application is a continuation of U.S. patent application Ser. No. 14/088,888, granted as U.S. Pat. No. 8,925,067, filed on Nov. 25, 2013, which is a continuation of U.S. patent application Ser. No. 12/883,394, granted as U.S. Pat. No. 8,594,103, filed on Sep. 16, 2010. The U.S. patent application Ser. No. 12/883,394, granted as U.S. Pat. No. 8,594,103 is a continuation of International Application No. PCT/CN2009/071009, which was filed on Mar. 25, 2009. The International Application claims priority to Chinese Patent Application No. 200810084076.1, filed on Mar. 26, 2008. The afore-mentioned patent applications are hereby incorporated by reference in their entireties.

TECHNICAL FIELD

The present invention relates to the communications field, and in particular, to a network access method, an authentication method, a communications system, and relevant devices.

BACKGROUND

The existing Digital Subscriber Line (DSL) network architecture evolves to the Internet Protocol (IP) Quality of Service (QoS)-enabled architecture based on Ethernet aggregation and connectivity. In this background, the general DSL reference architecture is shown in FIG. 1.

In FIG. 1, T is a reference point between User Equipment (UE) and a Residential Gateway (RG) in a Customer Premises Network (CPN); U is a reference point between the RG and an Access Node (AN) (namely, a Digital Subscriber Line Access Multiplexer (DSLAM)). In an access network, an aggregation network exists between the AN and a Broadband Remote Access Server (BRAS) or a Broadband Network Gateway (BNG), and V is an Ethernet aggregation reference point between the AN and the BRAS/BNG in the access network. A10 is a reference point between the access network and the service provider, and this reference point can connect an application service provider to a network service provider who owns the access network, or, in a roaming scenario, this reference point connects the network service provider to a visited access network. The CPN is interconnected with the access network through a DSL access technology. For a Passive Optical Network (PON), the AN is an Optical Line Termination (OLT) or an Optical Network Unit (ONU), and the CPN is interconnected with the access network through access technologies such as PON.

The DSL network architecture in the foregoing technical solution, however, supports only Internet Protocol version 4 (IPv4). With exhaustion of the IPv4 addresses, the DSL network architecture evolves to Internet Protocol version 6 (IPv6), which is an inevitable trend.

In IPv4, a Dynamic Host Configuration Protocol (DHCP) message carries subscriber line information to implement implicit user authentication. IPv6 may employ stateless address allocation. However, the prior art does not disclose how to implement implicit authentication based on subscriber line information in the case of stateless address allocation.

SUMMARY

Embodiments of the present invention provide a network access method, an authentication method, a communications system, and relevant devices to support implicit authentication based on subscriber line information in IPv6.

A network access method provided in an embodiment of the present invention includes: receiving, on an AN, a first request message sent from a UE, where the first request message carries a Link-Local Address (LLA); obtaining subscriber line information corresponding to the UE; and sending a second request message from the AN to a BNG, where the second request message carries the LLA and the subscriber line information and instructs the BNG to perform access authentication.

An authentication method provided in an embodiment of the present invention includes: receiving a request message sent from an AN to a BNG, where the request message carries subscriber line information and an LLA; sending an access request to an Authentication, Authorization and Accounting (AAA) server according to the subscriber line information; and receiving an authentication result returned by the AAA server, and detecting duplicate addresses for the LLA if the authentication result is authentication success, or sending a neighbor advertisement message to reject the LLA carried in the request message if the authentication result is authentication failure.

A communications system provided in an embodiment of the present invention includes: an AN, configured to: receive a first request message sent by a UE, where the first request message carries an LLA, obtain subscriber line information corresponding to the UE, and send a second request message that carries the LLA and the subscriber line information to a BNG; and the BNG, configured to: receive the second request message from the AN, and send an access request to an AAA server according to the subscriber line information, where the access request instructs the AAA server to perform access authentication.

An AN provided in an embodiment of the present invention includes: a receiving unit, configured to receive a first request message from a UE, where the first request message carries an LLA; an obtaining unit, configured to obtain subscriber line information corresponding to the UE; and a sending unit, configured to send a second request message to a BNG, where the second request message carries the LLA and the subscriber line information and instructs the BNG to perform access authentication.

A BNG provided in an embodiment of the present invention includes: a request receiving unit, configured to receive a request message from an AN, where the request message is a Neighbor Solicitation message and carries subscriber line information and an LLA; an access request sending unit, configured to send an access request to an AAA server according to the subscriber line information; an authentication result receiving unit, configured to: receive an authentication result sent by the AAA server, and trigger a proxy Duplicate Address Detection (DAD) unit to judge duplicate addresses if the authentication result is authentication success, or instruct the proxy DAD unit to send a neighbor advertisement message to reject the LLA configured by the user if the authentication result is authentication failure; and the proxy DAD unit, configured to judge whether any address in an address cache matches the LLA in the Neighbor Solicitation message.

A network access method provided in an embodiment of the present invention is applied to IPv6 and the method includes: receiving a first request message sent from a UE to an AN, where the first request message is a first Neighbor Solicitation message or a first router solicitation message; obtaining subscriber line information corresponding to the UE; and sending a second request message from the AN to a BNG, where the second request message carries the subscriber line information and is a second Neighbor Solicitation message or a second router solicitation message.

The foregoing technical solution shows that the embodiments of the present invention bring the following benefits.

In the embodiments of the present invention, the AN receives the first request message that carries an LLA from the UE, obtains the subscriber line information corresponding to the UE, and adds the subscriber line information to the second request message and sends the second request message to the BNG. In this way, the BNG can perform implicit authentication for the user according to the subscriber line information. Therefore, the embodiments of the present invention support implicit authentication based on subscriber line information in the case of IPv6.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The embodiments of the present invention provide a network access method, an authentication method, a communications system, and relevant devices to support implicit authentication based on subscriber line information in IPv6.

A network access method provided in an embodiment of the present invention includes: receiving, on an AN, a first request message from a UE, where the first request message carries an LLA; obtaining subscriber line information corresponding to the UE according to the first request message; and sending a second request message from the AN to a BNG, where the second request message carries the LLA and the subscriber line information and instructs the BNG to perform access authentication for the UE.

In practical applications, the first request message and the second request message may be Neighbor Solicitation messages, or router solicitation messages, or other types of request message. In this embodiment and subsequent embodiments, it is assumed that the first request message and the second request message are Neighbor Solicitation messages, which, however, shall not be construed as a limitation to the present invention.

In this embodiment, the AN receives the first Neighbor Solicitation message that carries the LLA from the UE, obtains the subscriber line information corresponding to the UE, and adds the subscriber line information to the second Neighbor Solicitation message and sends the second Neighbor Solicitation message to the BNG to instruct the BNG to perform access authentication. Therefore, this embodiment supports implicit authentication based on subscriber line information in the case of IPv6.

In the network access process in this embodiment, the access authentication function is provided. The process of access authentication is classified into two processes:

I. LLA processing:

In this embodiment, an LLA relay/proxy function is integrated in the AN. That is, when receiving a message that carries an LLA from the UE, the AN obtains the subscriber line information corresponding to the UE, and sends the obtained subscriber line information and LLA to the BNG for access authentication.

Figure 1:
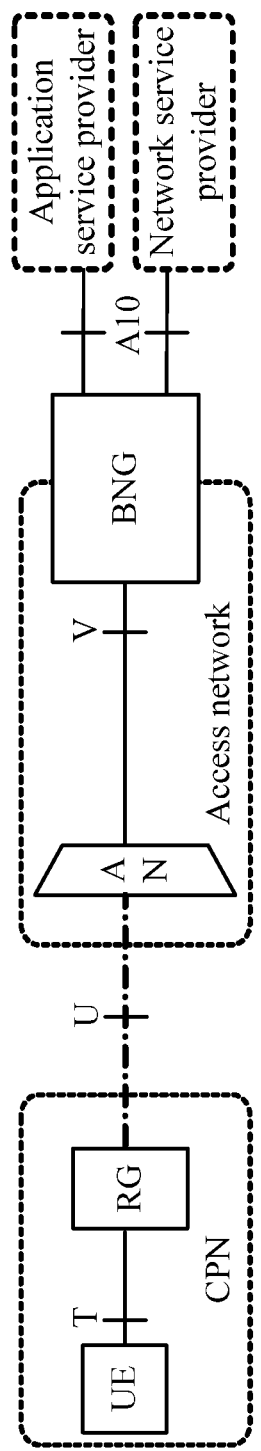
FIG. 1 shows DSL network architecture in the prior art.
Figure 2:
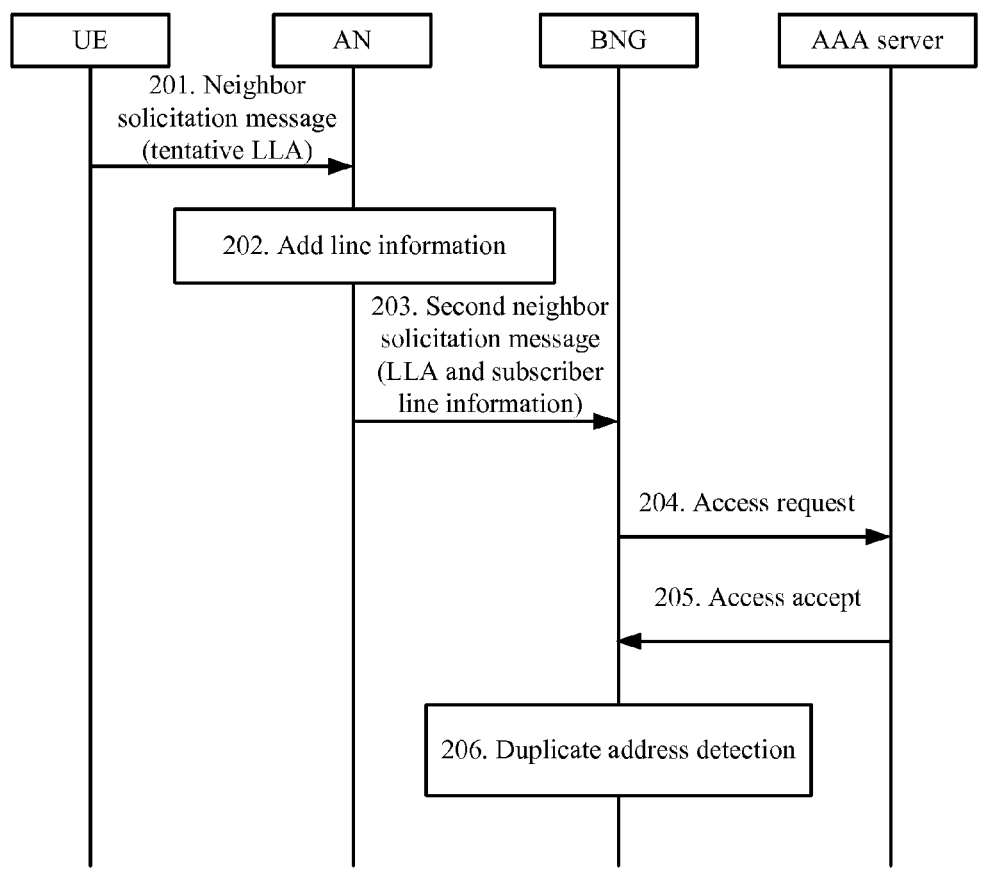
FIG. 2 is a flowchart of an authentication method in an embodiment of the present invention.

Specifically, according to the combination mode of the LLA and the subscriber line information, this mode is classified into the following two types:

A. The LLA and the subscriber line information are set in different positions or different fields of the same message for transmission. That is, the LLA is set in the LLA field that carries the LLA, and the subscriber line information is set in a field other than the LLA field:

As shown in FIG. 2, an authentication process in an embodiment of the present invention includes:

201. The UE sends a first Neighbor Solicitation message to the AN.

In this embodiment, the UE configures the LLA automatically in a preset mode. The configuration process is covered in the prior art, and thus is not further detailed here.

After completing the configuration of the LLA, the UE sends a first Neighbor Solicitation request to the AN. The message carries a tentative LLA. The UE automatically configures the tentative LLA according to preset configuration rules.

202. The AN adds line information to the first Neighbor Solicitation message.

The AN supports the LLA relay function. That is, the AN in this embodiment does not modify the tentative LLA, but only forwards it. When forwarding the tentative LLA, the AN forwards the subscriber line information together. Therefore, after obtaining the message, the AN queries the subscriber line information corresponding to the current UE. The subscriber line information identifies the line used by the user, and the subscriber line information may be a physical port identifier and/or a logical port identifier for host access, or another identifier capable of identifying the line used by the user.

In this embodiment, the tentative LLA and the subscriber line information are set in different positions or different fields of the same message for transmission. After obtaining the subscriber line information, the AN adds the subscriber line information to reserved bits or options of the first Neighbor Solicitation message to obtain the second Neighbor Solicitation message. That is, the second Neighbor Solicitation message carries the tentative LLA and the subscriber line information.

It is understandable that in this embodiment, the AN may add the subscriber line information to another position of the first Neighbor Solicitation message so long as the second Neighbor Solicitation message carries the subscriber line information. The specific position is not limited herein.

203. The AN sends the second Neighbor Solicitation message that carries the tentative LLA and the subscriber line information to the BNG.

After adding the subscriber line information to the first Neighbor Solicitation message to obtain the second Neighbor Solicitation message, the AN sends the second Neighbor Solicitation message to the BNG or BRAS.

It should be noted that the BNG mentioned in this embodiment and subsequent embodiments refers to the BNG and/or BRAS.

204. The BNG sends an access request to the AAA server.

In this embodiment, the BNG sends an access request to the AAA server according to the subscriber line information in the second Neighbor Solicitation message. The access request carries information about the subscriber line. Specifically:

The BNG sends an access request that carries subscriber line information to the AAA server, and the access request instructs the AAA server to authenticate the subscriber line information.

Or the BNG obtains the corresponding username and password according to the subscriber line information, and sends an access request that carries the username and password to the AAA server, and the access request instructs the AAA server to authenticate the username and password.

205. The AAA server performs authentication according to the access request, and returns an authentication result to the BNG.

In this embodiment, if the access request received by the AAA server carries subscriber line information, the AAA server authenticates the subscriber line information and returns an authentication result to the BNG; if the access request received by the AAA server carries a username and a password, the AAA server authenticates the username and password and returns an authentication result to the BNG. The authentication result can be authentication success or authentication failure.

If the authentication succeeds, the AAA server delivers a user service profile to the BNG for subsequent data communications.

206. The BNG detects duplicate addresses according to the authentication result returned by the AAA server.

In this embodiment, the BNG supports proxy DAD, and sets up and maintains an IP address cache of the represented user.

If the authentication result received by the BNG is authentication success, the BNG performs proxy DAD, that is, the BNG compares the obtained tentative LLA with the addressed stored in the preset address cache and judges whether any address in the address cache matches the tentative LLA. If any address in the address cache matches the tentative LLA, the BNG determines that an address conflict occurs, and sends a neighbor advertisement message in place of the owner of the matched address, or performs other exception handling processes. If no address in the address cache matches the tentative LLA, the BNG determines that no address conflict occurs, and adds the tentative LLA to the address cache.

If the authentication result received by the BNG is authentication failure, it is determined that an address conflict occurs. In such case, the BNG sends a neighbor advertisement message to the UE to reject the tentative LLA carried in the second request message and configured by the UE automatically.

It should be noted that in this embodiment, step 206 may be performed before the user authentication process (namely, before step 204 and step 205). That is, after step 203, the BNG compares the obtained tentative LLA with the addresses stored in the preset address cache and judges whether any address in the address cache matches the tentative LLA. If any address in the address cache matches the tentative LLA, the BNG determines that an address conflict occurs, and sends a neighbor advertisement message in place of the owner of the matched address, or performs other exception handling processes. If no address in the address cache matches the tentative LLA, the BNG determines that no address conflict occurs, and adds the tentative LLA to the address cache, and triggers the user authentication process, namely, step 204 and step 205.

Figure 3:
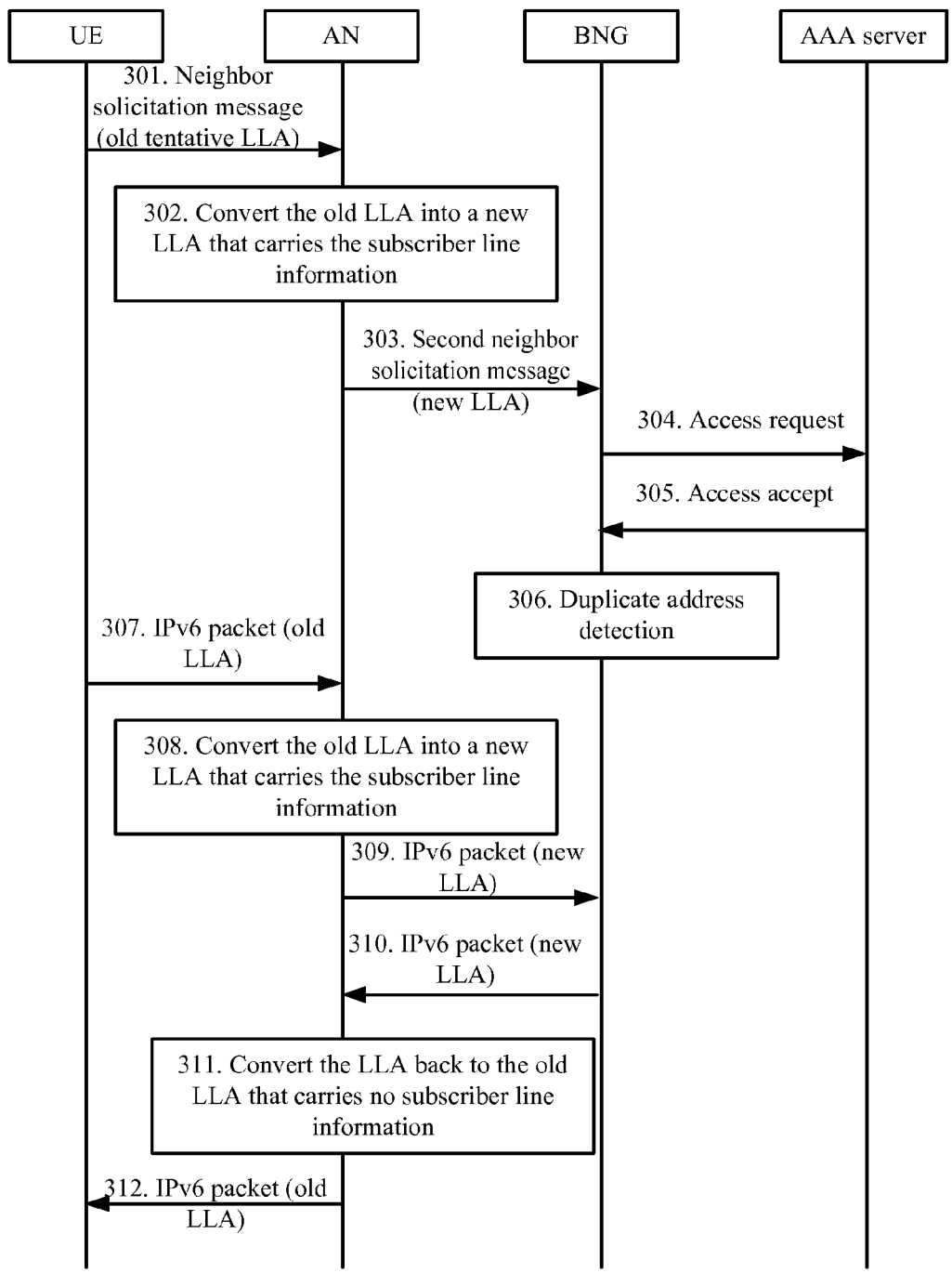
FIG. 3 is a flowchart of an authentication method in another embodiment of the present invention.

The foregoing embodiment deals with the scenario in which the LLA and the subscriber line information are in different positions or different fields of the same message for transmission. Described below is another scenario:

B. The subscriber line information is added to an LLA for transmission:

As shown in FIG. 3, an authentication process in another embodiment of the present invention includes:

301. The UE sends a first Neighbor Solicitation message to the AN.

In this embodiment, the UE configures the LLA automatically in a preset mode. The configuration process is covered in the prior art, and thus is not further detailed here.

After completing the configuration of the LLA, the UE sends a first Neighbor Solicitation request to the AN. The message carries a tentative LLA. The tentative LLA is configured automatically by the UE according to preset configuration rules.

302. The AN modifies the tentative LLA.

The AN supports the LLA proxy function. That is, in this embodiment, the AN modifies the received tentative LLA, and adds the subscriber line information to the tentative LLA.

After obtaining the message, the AN queries the subscriber line information corresponding to the current UE. The subscriber line information identifies the line used by the user, and may be a physical port identifier and/or a logical port identifier for host access, or another identifier capable of identifying the line used by the user.

In this embodiment, the subscriber line information is added to the tentative LLA of the second Neighbor Solicitation message for transmission. Specifically, after obtaining the subscriber line information, the AN adds the subscriber line information to all or partial bits of the interface identifier field of the tentative LLA, or the subscriber line information occupies the entire or part of the 54-bit field in the tentative LLA.

The structure of the tentative LLA of IPv6 is shown in Table 1:

TABLE 1

| 10 Bits | 54 Bits | 64 Bits |
|---|---|---|
| 1111 1110 10 | 0 | Interface identifier |

It is understandable that in this embodiment, the AN may add the subscriber line information to another position of the tentative LLA so long as the tentative LLA carries the subscriber line information. The specific position is not limited herein.

303. The AN sends the second Neighbor Solicitation message to the BNG.

In this embodiment, the second Neighbor Solicitation message carries a tentative LLA that carries the subscriber line information.

304. The BNG sends an access request to the AAA server.

In this embodiment, the BNG sends an access request to the AAA server according to the subscriber line information in the second Neighbor Solicitation message. The access request carries information about the subscriber line. Specifically:

The BNG sends an access request that carries subscriber line information to the AAA server, and the access request instructs the AAA server to authenticate the subscriber line information.

Or the BNG obtains the corresponding username and password according to the subscriber line information, and sends an access request that carries the username and password to the AAA server, and the access request instructs the AAA server to authenticate the username and password.

305. The AAA server performs authentication according to the access request, and returns an authentication result to the BNG.

In this embodiment, if the access request received by the AAA server carries subscriber line information, the AAA server authenticates the subscriber line information and returns an authentication result to the BNG; if the access request received by the AAA server carries a username and a password, the AAA server authenticates the username and password and returns an authentication result to the BNG. The authentication result may be authentication success or authentication failure.

If the authentication succeeds, the AAA server delivers a user service profile to the BNG for subsequent data communications.

306. The BNG detects duplicate addresses according to the authentication result returned by the AAA server.

In this embodiment, the BNG supports proxy DAD, and sets up and maintains an IP address cache of the represented user.

If the authentication result received by the BNG is authentication success, the BNG performs proxy DAD, that is, the BNG compares the obtained tentative LLA that carries the subscriber line information with the addresses stored in the preset address cache and judges whether any address in the address cache matches the tentative LLA. If any address in the address cache matches the tentative LLA, the BNG determines that an address conflict occurs, and sends a neighbor advertisement message in place of the owner of the matched address, or performs other exception handling processes. If no address in the address cache matches the tentative LLA, the BNG determines that no address conflict occurs, and adds the tentative LLA that carries the subscriber line information to the address cache.

If the authentication result received by the BNG is authentication failure, it is determined that an address conflict occurs. In such case, the BNG sends a neighbor advertisement message to the UE to reject the tentative LLA carried in the second Neighbor Solicitation message and configured by the UE automatically.

It should be noted that in this embodiment, step 306 may be performed before the user authentication process (namely, before step 304 and step 305). That is, after step 303, the BNG compares the obtained tentative LLA with the addresses stored in the preset address cache and judges whether any address in the address cache matches the tentative LLA. If any address in the address cache matches the tentative LLA, the BNG determines that an address conflict occurs, and sends a neighbor advertisement message in place of the owner of the matched address, or performs other exception handling processes. If no address in the address cache matches the tentative LLA, the BNG determines that no address conflict occurs, and adds the tentative LLA that carries the subscriber line information to the address cache, and triggers the user authentication process, namely, step 304 and step 305.

307. The UE sends an IPv6 packet that carries the LLA to the AN. The IPv6 packet carries no subscriber line information.

In this embodiment, the LLA in the IPv6 packet sent by the UE to the AN carries no subscriber line information.

308. The AN modifies the LLA so that the modified LLA carries the subscriber line information.

The modification mode may be: The AN adds the subscriber line information to the LLA of the IPv6 packet. The adding mode is similar to the adding mode in step 302 above, and is not further described.

309-310. The AN exchanges the IPv6 packet that carries the new LLA with the BNG.

311. The AN modifies the LLA that carries the subscriber line information in the IPv6 packet sent by the BNG so that the LLA carries no subscriber line information.

312. The AN sends the IPv6 packet that carries the LLA to the UE, and this LLA carries no subscriber line information.

In this embodiment, the AN modifies the information in the LLA; when interacting with the BNG, the AN adds the subscriber line information to the LLA; when interacting with the UE, the AN changes the LLA back to the LLA that carries no subscriber line information.

It should be noted that in the foregoing embodiment, steps 307-312 are optional.

Described above is LLA processing. In practical applications, after the LLA is processed, the global IPv6 address may be processed, which includes access authentication and address allocation:

II. Global IPv6 address processing:

In this embodiment, a Prefix Discovery (PD) relay/proxy function is integrated in the AN. When receiving a message that carries an on-link prefix from the UE, the AN obtains the subscriber line information corresponding to the UE, and sends the obtained subscriber line information to the BNG for performing access authentication and global IPv6 address allocation.

It should be noted that in this embodiment, the PD relay is integrated in the AN, which means that, if the AN discovers that the router solicitation message sent by the UE carries the on-link prefix of the user, the AN obtains the line information corresponding to the UE, and sends the on-link prefix and the obtained subscriber line information to the BNG for performing access authentication and global IPv6 address allocation, but the AN does not modify the on-link prefix.

Or in this embodiment, the PD relay is integrated in the AN, which means that, if the AN discovers that the router solicitation message sent by the UE carries the on-link prefix of the user, the AN obtains the line information corresponding to the UE, and sends the on-link prefix and the obtained subscriber line information to the BNG for performing access authentication and global IPv6 address allocation, and at the same time, the AN modifies the on-link prefix, for example, adds the subscriber line information to the on-link prefix.

Figure 4:
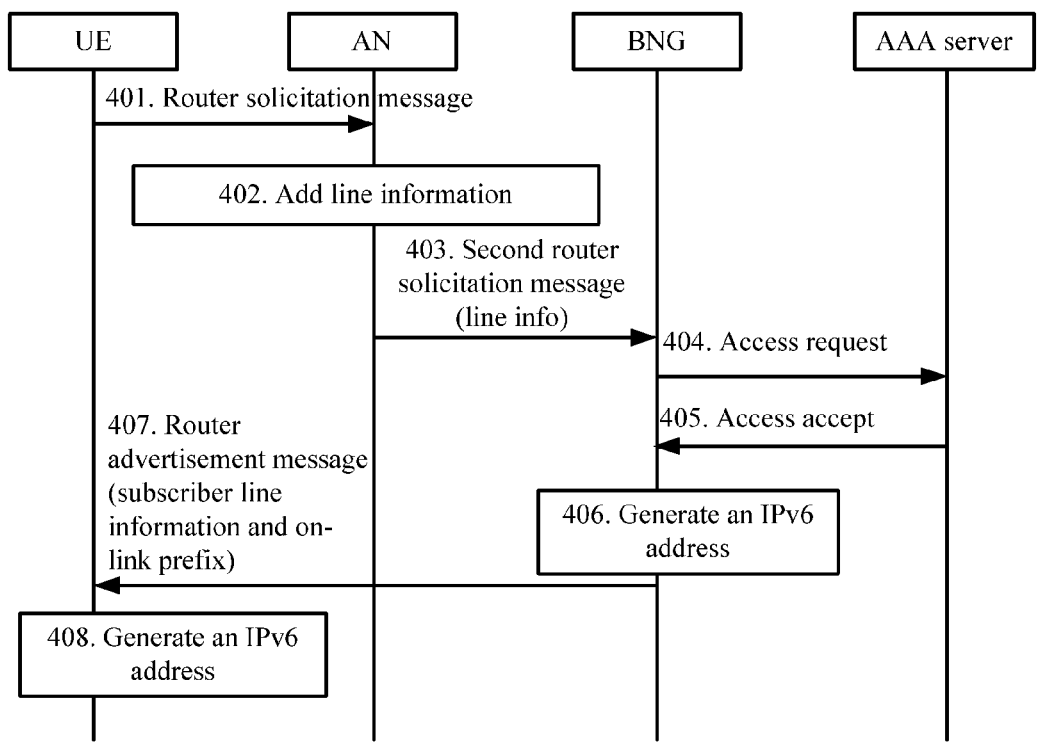
FIG. 4 is a flowchart of an authentication method in an embodiment of the present invention.

Specifically, according to whether the AN participates in conversion of the on-link prefix, this mode is classified into the following two types:

A. The AN does not participate in conversion of the on-link prefix, but supports the PD relay function:

As shown in FIG. 4, an authentication process in another embodiment of the present invention includes:

401. The UE sends a first router solicitation message to the AN.

In this embodiment, the UE sends the first router solicitation message to request the BNG to return a router advertisement message, so as to learn the on-link prefix.

In this embodiment, the first router solicitation message carries the on-link prefix of the user.

402. The AN adds the subscriber line information to obtain the second router solicitation message that carries the subscriber line information.

Because the AN supports the PD relay function, the AN queries the subscriber line information corresponding to the current UE after receiving the first router solicitation message. The subscriber line information identifies the line used by the user, and may be a physical port identifier and/or a logical port identifier for host access, or another identifier capable of identifying the line used by the user.

In this embodiment, after obtaining the subscriber line information, the AN adds the subscriber line information and the on-link prefix to reserved bits or options of the first router solicitation message to obtain the second router solicitation message. That is, the second router solicitation message carries the subscriber line information and the on-link prefix.

It is understandable that in this embodiment, the AN may add the subscriber line information to other positions of the first router solicitation message, and the specific positions are not limited.

403. The AN sends the second router solicitation message that carries the subscriber line information to the BNG.

404. The BNG sends an access request to the AAA server.

In this embodiment, the BNG sends an access request to the AAA server according to the subscriber line information in the second router solicitation message. The access request carries information about the subscriber line. Specifically:

The BNG sends an access request that carries subscriber line information to the AAA server, and the access request instructs the AAA server to authenticate the subscriber line information.

Or the BNG obtains the corresponding username and password according to the subscriber line information, and sends an access request that carries the username and password to the AAA server, and the access request instructs the AAA server to authenticate the username and password.

405. The AAA server performs authentication according to the access request, and returns an authentication result to the BNG.

In this embodiment, if the access request received by the AAA server carries subscriber line information, the AAA server authenticates the subscriber line information and returns an authentication result to the BNG; if the access request received by the AAA server carries a username and a password, the AAA server authenticates the username and password and returns an authentication result to the BNG. The authentication result may be authentication success or authentication failure.

If the authentication fails, the BNG rejects to return the on-link prefix to the user, and does not generate the global IPv6 address of the user.

If the authentication succeeds, the AAA server delivers a user service profile to the BNG for subsequent data communications, and triggers subsequent steps.

406. The BNG generates a global IPv6 address that carries the subscriber line information.

In this embodiment, the BNG may generate the global IPv6 address in three modes:

(1) The BNG retrieves an interface identifier from the LLA applied in the previous LLA processing (the LLA carries the subscriber line information, as described in the embodiment shown in FIG. 3), and appends the interface identifier that carries the subscriber line information to the on-link prefix of the user to generate the global IPv6 address of the user;

(2) The BNG retrieves an interface identifier from the LLA applied in the previous LLA processing (the LLA carries no subscriber line information, as described in the embodiment shown in FIG. 2), obtains the subscriber line information from the second router solicitation message, combines the subscriber line information with the interface identifier and appends them to the on-link prefix of the user to generate the global IPv6 address of the user; and (3) The BNG retrieves an interface identifier from the LLA applied in the previous LLA processing (the LLA carries no subscriber line information, as described in the embodiment shown in FIG. 2), obtains the subscriber line information from the second router solicitation message, uses the subscriber line information as a part of the on-link prefix, and appends the interface identifier to the user's on-link prefix that carries the line information to generate the global IPv6 address of the user.

It should be noted that the three modes above are only examples of the process of generating a global IPv6 address according to the embodiments of the present invention. In practical applications, the foregoing information may also be combined in any way to generate a global IPv6 address, and the generation mode is not limited.

407. The BNG sends a router advertisement message to the UE through the AN, where the router advertisement message carries the on-link prefix that carries the subscriber line information.

Specifically, according to the mode of generating the address in step 406, the position of the subscriber line information in this step varies. For mode (1) and mode (2) in step 406, the subscriber line information is added to the reserved bits or options of the router advertisement message. For mode (3) in step 406, the subscriber line information is added to the on-link prefix.

In this embodiment, the AN does not participate in the conversion of the on-link prefix, and therefore, the router advertisement message sent by the BNG is forwarded to the UE directly.

408. The UE configures the global IPv6 address that carries the subscriber line information automatically.

After receiving the router advertisement message sent by the BNG, the UE generates a global IPv6 address according to the subscriber line information, interface identifier, and on-link prefix. The generation process is similar to the process of the BNG generating the global IPv6 address in step 406, and corresponds to the mode of the BNG generating the global IPv6 address.

The scenario in which the AN does not participate in the conversion of the on-link prefix is described above. The following describes the scenario in which the AN participates in the conversion of the on-link prefix.

Figure 5:
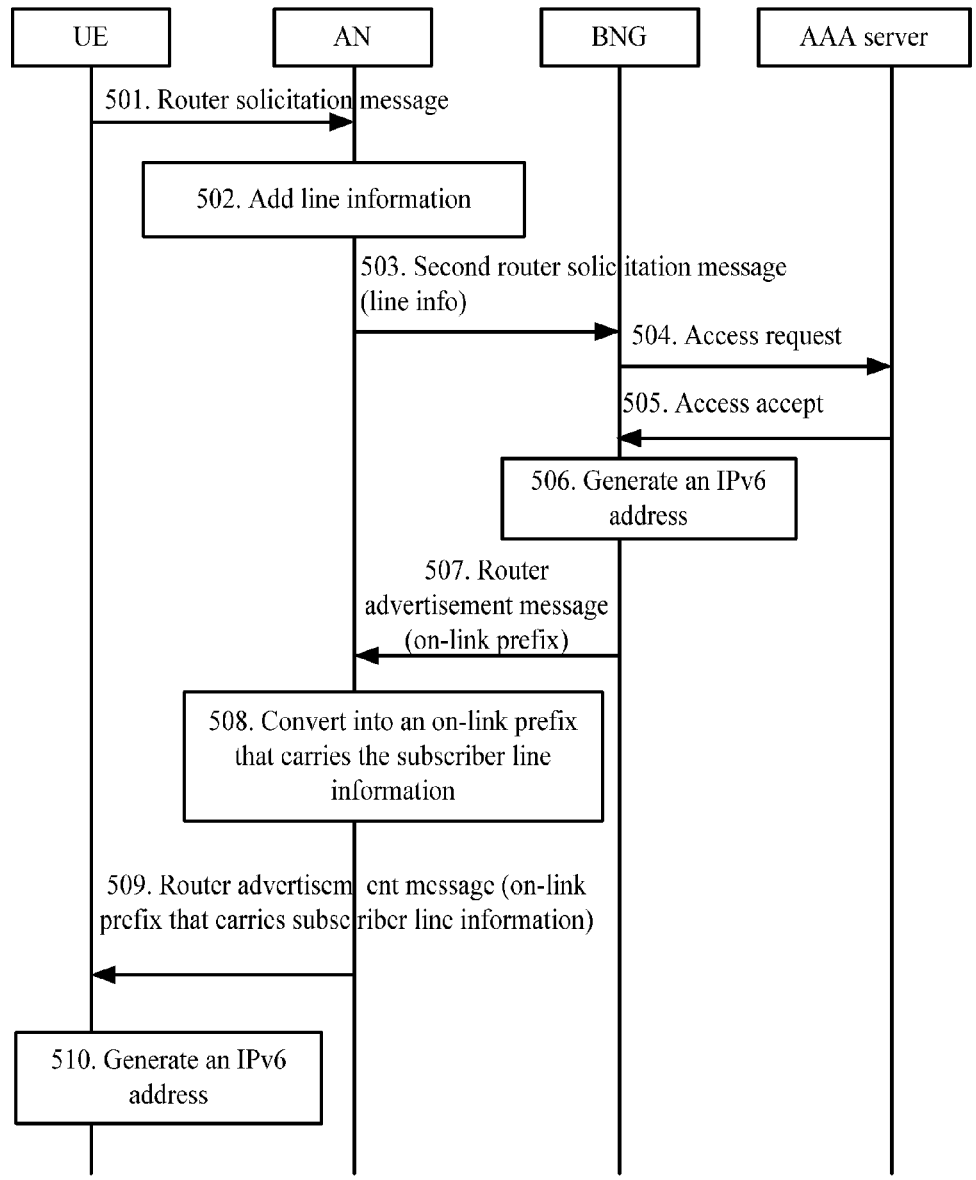
FIG. 5 is a flowchart of an authentication method in an embodiment of the present invention.

B. The AN participates in the conversion of the on-link prefix, and supports the PD proxy function:

As shown in FIG. 5, an authentication process in another embodiment of the present invention includes:

501. The UE sends a first router solicitation message to the AN.

In this embodiment, the UE sends the first router solicitation message to request the BNG to return a router advertisement message, so as to learn the on-link prefix.

In this embodiment, the first router solicitation message carries the on-link prefix of the user.

502. The AN adds the subscriber line information.

Because the AN supports the PD proxy function, the AN queries the subscriber line information corresponding to the current UE after receiving the first router solicitation message. The subscriber line information may be a physical port identifier and/or a logical port identifier for host access, or another identifier capable of identifying the line used by the user.

In this embodiment, after obtaining the subscriber line information, the AN adds the subscriber line information and the on-link prefix to reserved bits or options of the first router solicitation message to obtain the second router solicitation message. That is, the second router solicitation message carries the subscriber line information and the on-link prefix.

It is understandable that in this embodiment, the AN may add the subscriber line information to other positions of the first router solicitation message, and the specific positions are not limited.

503. The AN sends the second router solicitation message that carries the subscriber line information to the BNG.

504. The BNG sends an access request to the AAA server.

In this embodiment, the BNG sends an access request to the AAA server according to the subscriber line information in the second router solicitation message. The access request carries information about the subscriber line. Specifically:

The BNG sends an access request that carries subscriber line information to the AAA server, and the access request instructs the AAA server to authenticate the subscriber line information.

Or the BNG obtains the corresponding username and password according to the subscriber line information, and sends an access request that carries the username and password to the AAA server, and the access request instructs the AAA server to authenticate the username and password.

505. The AAA server performs authentication according to the access request, and returns an authentication result to the BNG.

In this embodiment, if the access request received by the AAA server carries subscriber line information, the AAA server authenticates the subscriber line information and returns an authentication result to the BNG; if the access request received by the AAA server carries a username and a password, the AAA server authenticates the username and password and returns an authentication result to the BNG. The authentication result may be authentication success or authentication failure.

If the authentication fails, the BNG rejects to return the on-link prefix to the user, and does not generate the global IPv6 address of the user.

If the authentication succeeds, the AAA server delivers a user service profile to the BNG for subsequent data communications, and triggers subsequent steps.

506. The BNG generates a global IPv6 address that carries the subscriber line information.

In this embodiment, the BNG may generate the global IPv6 address in three modes:

(1) The BNG retrieves an interface identifier from the LLA applied in the previous LLA processing (the LLA carries the subscriber line information, as described in the embodiment shown in FIG. 3), and appends the interface identifier that carries the subscriber line information to the on-link prefix of the user to generate the global IPv6 address of the user;

(2) The BNG retrieves an interface identifier from the LLA applied in the previous LLA processing (the LLA carries no subscriber line information, as described in the embodiment shown in FIG. 2), obtains the subscriber line information from the second router solicitation message, combines the subscriber line information with the interface identifier and appends them to the on-link prefix of the user to generate the global IPv6 address of the user; and (3) The BNG retrieves an interface identifier from the LLA applied in the previous LLA processing (the LLA carries no subscriber line information, as described in the embodiment shown in FIG. 2), obtains the subscriber line information from the second router solicitation message, uses the subscriber line information as a part of the on-link prefix, and appends the interface identifier to the user's on-link prefix that carries the line information to generate the global IPv6 address of the user.

It should be noted that the three modes above are only examples of the process of generating a global IPv6 address according to the embodiments of the present invention. In practical applications, the foregoing information may be combined in any way to generate a global IPv6 address. The generation mode is not limited.

507. The BNG sends a router advertisement message that carries the on-link prefix to the AN.

508. The AN converts the on-link prefix in the router advertisement message into the on-link prefix that carries the subscriber line information.

In this embodiment, the AN participates in the conversion of the on-link prefix, and therefore, the AN adds the obtained subscriber line information to the received on-link prefix to obtain the on-link prefix that carries the subscriber line information.

509. The AN sends the on-link prefix that carries the subscriber line information to the UE.

After adding the subscriber line information to the on-link prefix to obtain the on-link prefix that carries the subscriber line information, the AN adds the on-link prefix that carries the subscriber line information to the router advertisement message, and sends the router advertisement message to the UE.

510. The UE configures the global IPv6 address that carries the subscriber line information automatically.

After receiving the router advertisement message sent by the AN, the UE generates a global IPv6 address according to the subscriber line information, interface identifier, and on-link prefix. The generation process is similar to the process of the BNG generating the global IPv6 address in step 506, and corresponds to the mode of the BNG generating the global IPv6 address.

In this embodiment, the AN receives the first Neighbor Solicitation message or first router solicitation message from the UE, obtains the subscriber line information corresponding to the UE, and adds the subscriber line information to the second Neighbor Solicitation message or second router solicitation message and sends the message to the BNG. In this way, the BNG can perform implicit authentication for the user according to the subscriber line information. Therefore, this embodiment of the present invention supports implicit authentication based on subscriber line information in the case of IPv6.

In the process of processing the global IPv6 address, the BNG and the UE may generate the global IPv6 address according to the subscriber line information. Therefore, the technical solution in this embodiment implements the address allocation and access authentication in IPv6 architecture.

Figure 6:
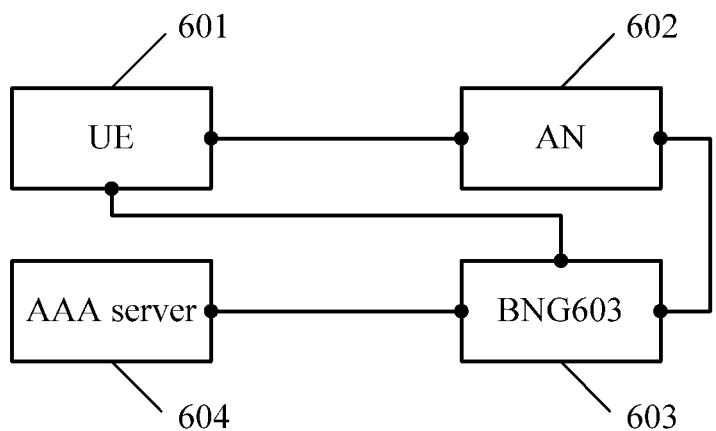
FIG. 6 shows a communications system in an embodiment of the present invention.

The following describes a communications system provided in an embodiment of the present invention. As shown in FIG. 6, the communications system in an embodiment of the present invention includes a UE 601, an AN 602, a BNG 603, and an AAA server 604.

The UE 601 is configured to send a first request message to the AN 602, where the first request message may be a first Neighbor Solicitation message that carries an LLA.

The AN 602 is configured to: receive the Neighbor Solicitation message sent by the UE 601, where the Neighbor Solicitation message carries the LLA, obtain subscriber line information corresponding to the UE 601, and send a second Neighbor Solicitation message that carries the LLA and the subscriber line information to the BNG 603.

Specifically, the AN 602 may use an LLA relay processing mode or an LLA proxy processing mode to send the second Neighbor Solicitation message that carries the LLA and the subscriber line information to the BNG 603:

In LLA relay processing mode, the AN 602 adds the LLA and the subscriber line information to different positions or different fields of the second Neighbor Solicitation message, and sends the second Neighbor Solicitation message to the BNG 603.

In LLA proxy processing mode, the AN 602 converts the LLA inclusive of no subscriber line information into the LLA inclusive of the subscriber line information, adds the LLA inclusive of the subscriber line information to the second Neighbor Solicitation message, and sends the second Neighbor Solicitation message to the BNG 603.

The BNG 603 is configured to: receive the second Neighbor Solicitation message sent by the AN 602, and send an access request to the AAA server 604 according to the subscriber line information.

In this embodiment, after receiving an authentication result returned by the AAA server 604, the BNG 603 detects duplicate addresses for the LLA if the authentication result is authentication success, or sends a neighbor advertisement message to reject the LLA carried in the second Neighbor Solicitation message and configured by the user if the authentication result is authentication failure.

The AAA server 604 is configured to perform access authentication according to the access request sent by the BNG 603.

Described above is an LLA processing process. In a global IPv6 address processing process, the access authentication system may further include: a second AN, configured to: receive the router solicitation message sent by the UE 601, perform PD relay operations, and send a second router solicitation message that carries the subscriber line information to the BNG 603; and a second BNG, configured to: receive the second router solicitation message, and send an access request to the AAA server 604 according to the subscriber line information in the second router solicitation message.

The functions of the second AN above can be implemented in the AN 602; and the functions of the second BNG above can be implemented in the BNG 603.

It should be noted that when the subscriber line information is carried in the LLA, the AN 602 is further configured to convert the LLA sent by the UE 601 and inclusive of no subscriber line information into the LLA inclusive of the subscriber line information, and convert the LLA sent by the BNG 603 and inclusive of the subscriber line information into the LLA inclusive of no subscriber line information.

It should be noted that in processing the global IPv6 address, the BNG 603 is further configured to generate a global IPv6 address according to the subscriber line information, the on-link prefix corresponding to the UE, and/or the interface identifier. The generation process is detailed in the method embodiment above.

Figure 7:
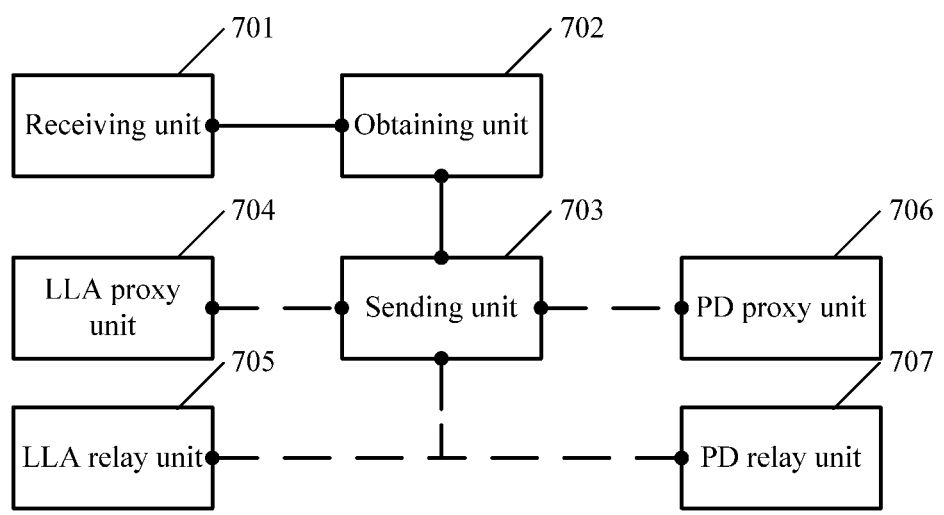
FIG. 7 shows an AN in an embodiment of the present invention.

As shown in FIG. 7, an AN provided in an embodiment of the present invention includes: a receiving unit 701, configured to receive a first request message sent by the UE, where the first request message may be a Neighbor Solicitation message or a router solicitation message, and the first request message (such as the Neighbor Solicitation message) may carry an LLA; an obtaining unit 702, configured to obtain subscriber line information corresponding to the UE; and a sending unit 703, configured to send a second request message to a BNG, where the second request message carries the subscriber line information and instructs the BNG to perform access authentication; the first request message and the second request message may be Neighbor Solicitation messages, or second router solicitation messages. The subscriber line information and the LLA (or on-link prefix) may be set in different fields of the same message, or in the same field such as the LLA field.

The AN in this embodiment may further include: an LLA proxy unit 704, configured to: convert the LLA carried in the first request message into the LLA that carries the subscriber line information, and set the LLA that carries the subscriber line information into the second request message; and convert the LLA sent by the BNG and inclusive of the subscriber line information into the LLA inclusive of no subscriber line information; and/or, an LLA relay unit 705, configured to: add the LLA in the first request message and the subscriber line information obtained by the obtaining unit to different positions or different fields of the second request message, namely, the LLA field and a field other than the LLA field.

In this embodiment, the receiving unit 701 is further configured to receive the first router solicitation message sent by the UE, where the first router solicitation message carries an on-link prefix which is an identifier of the on-link prefix corresponding to the UE.

The sending unit 703 is further configured to send the second router solicitation message that carries the on-link prefix and the subscriber line information to the BNG.

The AN in this embodiment may further include: a PD proxy unit 706, configured to: add subscriber line information to the on-link prefix sent by the BNG, and send the on-link prefix that carries the subscriber line information to the UE; and/or a PD relay unit 707, configured to forward the on-link prefix sent by the BNG and inclusive of the subscriber line information to the UE.

Figure 8:
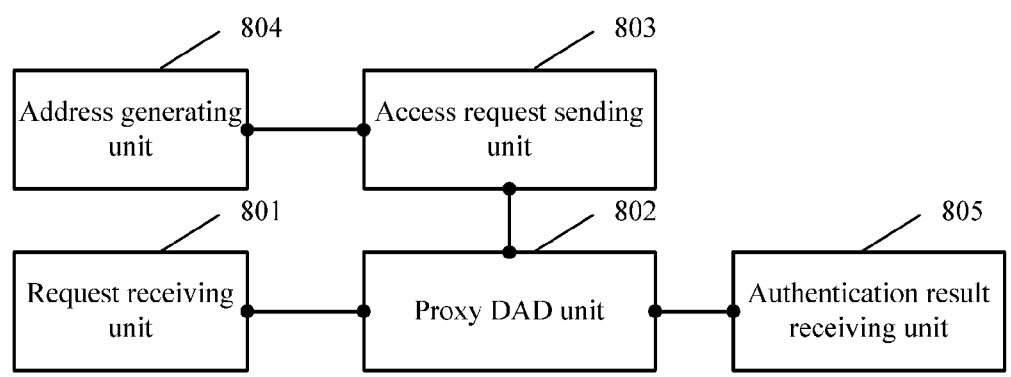
FIG. 8 shows a BNG in an embodiment of the present invention.

As shown in FIG. 8, a BNG provided in an embodiment of the present invention includes: a request receiving unit 801, configured to: receive a second request message sent by an AN and inclusive of the subscriber line information, where the second request message may be a second Neighbor Solicitation message and/or a second router solicitation message, and may further carry an LLA; an access request sending unit 803, configured to send an access request to an AAA server according to the subscriber line information; an authentication result receiving unit 805, configured to: receive an authentication result sent by the AAA server, and trigger a proxy DAD unit 802 to detect duplicate addresses if the authentication result is authentication success, or instruct the proxy DAD unit 802 to send a neighbor advertisement message to reject the LLA configured by the user if the authentication result is authentication failure; and the proxy DAD unit 802, configured to judge whether any address in an address cache matches the LLA in the Neighbor Solicitation message.

In practical applications, the proxy DAD unit 802 may perform corresponding operations as triggered by the authentication result receiving unit 805. Specifically:

If the authentication result received by the authentication result receiving unit 805 from the AAA server is authentication success, the authentication result receiving unit 805 triggers the proxy DAD unit 802 to detect duplicate addresses. That is, the proxy DAD unit 802 compares the obtained LLA with the addresses stored in the preset address cache and judges whether any address in the address cache matches the LLA. If any address in the address cache matches the LLA, the proxy DAD unit 802 determines that an address conflict occurs, and sends a neighbor advertisement message in place of the owner of the matched address, or performs other exception handling processes. If no address in the address cache matches the LLA, the proxy DAD unit 802 determines that no address conflict occurs, and adds the LLA carried in the Neighbor Solicitation message to the address cache.

If the authentication result received by the authentication result receiving unit 805 from the AAA server is authentication failure, the authentication result receiving unit 805 notifies the proxy DAD unit 802 to send a neighbor advertisement message to the UE. That is, the proxy DAD unit 802 may deem that an address conflict occurs, namely, send a neighbor advertisement message to the UE to reject the LLA automatically configured by the UE.

In the process described above, the authentication result receiving unit 805 controls the proxy DAD unit 802 to perform the corresponding operations according to the authentication result returned by the AAA server. In practical applications, the operation of detecting duplicate addresses may be performed before the authentication is initiated, that is, the proxy DAD unit 802 is configured to judge whether any address in the address cache matches the LLA in the Neighbor Solicitation message. If any address in the address cache matches the LLA, the proxy DAD unit 802 determines that an address conflict occurs, and sends a neighbor advertisement message in place of the owner of the matched address, or performs other exception handling processes. If no address in the address cache matches the LLA, the proxy DAD unit 802 determines that no address conflict occurs, and controls the access request sending unit 803 to send an access request to the AAA server according to the subscriber line information. In this case, the authentication result receiving unit 805 is only configured to receive the authentication result returned by the AAA server after the access request sending unit 803 sends the access request to the AAA server.

The request receiving unit 801 is further configured to receive the router solicitation message that carries the on-link prefix and the subscriber line information. The BNG in this embodiment may further include: an address generating unit 804, configured to allocate the address according to the on-link prefix, subscriber line information, and preset interface identifier.

In this embodiment, the address generating unit 804 may generate the global IPv6 address in the following three modes but without limitation to the following three modes:

(1) The BNG retrieves an interface identifier from the LLA applied in the previous LLA processing (the LLA carries the subscriber line information, as described in the embodiment shown in FIG. 3), and appends the interface identifier that carries the subscriber line information to the on-link prefix of the user to generate the global IPv6 address of the user;

(2) The BNG retrieves an interface identifier from the LLA applied in the previous LLA processing (the LLA carries no subscriber line information, as described in the embodiment shown in FIG. 2), obtains the subscriber line information from the second router solicitation message, combines the subscriber line information with the interface identifier and appends them to the on-link prefix of the user to generate the global IPv6 address of the user; and (3) The BNG retrieves an interface identifier from the LLA applied in the previous LLA processing (the LLA carries no subscriber line information, as described in the embodiment shown in FIG. 2), obtains the subscriber line information from the second router solicitation message, uses the subscriber line information as a part of the on-link prefix, and appends the interface identifier to the user's on-link prefix that carries the line information to generate the global IPv6 address of the user.

In the foregoing embodiment, after receiving the first Neighbor Solicitation message or the first router solicitation message from the UE, the AN obtains the subscriber line information corresponding to the UE, adds the subscriber line information to the second Neighbor Solicitation message and sends it to the BNG, instructing the BNG to perform access authentication. Therefore, this embodiment supports implicit authentication based on subscriber line information in the case of IPv6.

Secondly, in the process of processing the global IPv6 address, the BNG and the UE may generate the global IPv6 address according to the subscriber line information. Therefore, the technical solution in this embodiment implements the address allocation and access authentication in IPv6 architecture.

Persons of ordinary skill in the art understand that all or part of the steps of the method specified in any of the embodiments above may be implemented by a program instructing relevant hardware. The program may be stored in a computer readable storage medium. When the program runs, the following steps are performed: receiving, on an AN, a first request message from a UE, where the first request message carries an LLA; obtaining subscriber line information corresponding to the UE; and sending a second request message from the AN to a BNG, where the second request message carries the LLA and the subscriber line information and instructs the BNG to perform access authentication.

The storage medium may be a Read Only Memory (ROM), a magnetic disk, or a Compact Disk-Read Only Memory (CD-ROM).

Detailed above are a network access method, an authentication method, a communications system, and relevant devices under the present invention. Although the invention is described through some exemplary embodiments, the invention is not limited to such embodiments. It is apparent that those skilled in the art can make modifications and variations to the invention without departing from the scope of the invention. The invention is intended to cover the modifications and variations provided that they fall within the scope of protection defined by the following claims or their equivalents.

What is claimed is:

1. In a Broadband Network Gateway (BNG), an authentication method comprising:
   receiving a Router Solicitation (RS) message sent from an Access Node (AN), wherein the RS message carries line information identifying a communication line and carries a Link Local Address (LLA); and based on the line information carried in the RS message, performing access authentication with an Authentication, Authorization and Accounting (AAA) server.

2. The method according to claim 1, wherein before receiving the RS message sent from the AN, the method comprises:
comparing an tentative LLA received by the BNG with at least one address stored in an address cache in the BNG;
determining whether an address in the address cache matches the tentative LLA; and
determining that there is no address duplication with the tentative LLA if no address in the address cache matches the tentative LLA.

3. The method according to claim 1, wherein performing the access authentication with the AAA server comprises:
sending an access request carrying the line information to the AAA server; and
receiving a response carrying authentication result from the AAA server.

4. A Broadband Network Gateway (BNG), comprising a processor, a memory in which instructions are stored and an interface, configured to:
receive a Router Solicitation (RS) message sent from an Access Node (AN), wherein the RS message carries line information identifying a communication line and carries a Link Local Address (LLA); and
based on the line information carried in the RS message, perform access authentication with an Authentication, Authorization and Accounting (AAA) server.

5. The BNG according to claim 4, further configured to:
compare a tentative LLA received by the BNG with at least one address stored in an address cache in the BNG; and
determine whether an address in the address cache matches the tentative LLA; and
determine that there is no address duplication with the tentative LLA if no address in the address cache matches the tentative LLA.

6. The BNG according to claim 5, wherein the BNG is configured to:
send an access request carrying the line information to the AAA server; and
receive a response carrying authentication result from the AAA server.

7. A computer program product for use in a Broadband Network Gateway (BNG), the computer program product comprising computer executable instructions stored on a non-transitory medium in such a way that, when executed by a processor, cause the BNG to:
receive a Router Solicitation (RS) message sent from an Access Node (AN), wherein the RS message carries line information identifying a communication line and carries a Link Local Address (LLA); and
based on the line information carried in the RS message, perform access authentication with an Authentication, Authorization and Accounting (AAA) server.

8. The computer program product according to claim 7, wherein the computer executable instructions further cause the BNG to:
compare a tentative LLA received by the BNG with at least one address stored in an address cache in the BNG; and
determine whether an address in the address cache matches the tentative LLA; and
determine that there is no address duplication with the tentative LLA if no address in the address cache matches the tentative LLA.

9. The computer program product according to claim 8, wherein the computer executable instructions that cause the BNG to perform the access authentication with the AAA server cause the BNG to:
send an access request carrying the line information to the AAA server; and
receive a response carrying authentication result from the AAA server.

* * * * *